United States Patent [19]

Froom

[11] E Patent Number: Re. 33,573

[45] Reissued Date of Patent: Apr. 16, 1991

[54] FOLDING ICE-CREAM CARTON, CARTON BLANK AND METHOD

[76] Inventor: Thomas W. Froom, 10 Burncoat Way, Pittsford, N.Y. 14534

[21] Appl. No.: 23,845

[22] Filed: Mar. 9, 1987

Related U.S. Patent Documents

Reissue of:

[64] Patent No.: 4,526,563
Issued: Jul. 2, 1985
Appl. No.: 530,367
Filed: Sep. 8, 1983

U.S. Applications:

[62] Division of Ser. No. 331,557, Dec. 17, 1981, Pat. No. 4,431,129, which is a division of Ser. No. 158,167, Jun. 10, 1980, Pat. No. 4,328,656, which is a division of Ser. No. 842,747, Oct. 17, 1977, Pat. No. 4,239,115.

[51] Int. Cl.[5] ..... B65B 43/08; B65B 43/26

[52] U.S. Cl. ..... 493/151; 493/156; 493/183

[58] Field of Search ..... 493/114, 126, 131, 132, 493/137, 150, 151, 162, 183, 309, 156; 229/151; 206/626; 53/456, 491, 383

[56] References Cited

U.S. PATENT DOCUMENTS

| | | | |
|---|---|---|---|
| 1,509,383 | 9/1924 | Walter | 229/151 |
| 2,342,198 | 2/1944 | Hultin | 53/491 X |
| 2,369,385 | 2/1945 | Carruth et al. . | |
| 2,496,043 | 1/1950 | Farrell . | |
| 3,040,957 | 6/1962 | Meyers | 206/626 X |
| 3,109,577 | 11/1963 | Knipp . | |
| 3,144,980 | 8/1964 | Larson | 206/626 X |
| 3,195,800 | 7/1965 | Cote | 206/626 X |
| 3,197,114 | 7/1965 | Holmes . | |
| 3,206,915 | 9/1965 | Anderson et al. | 53/383 X |
| 3,265,285 | 8/1966 | Fanter . | |
| 3,309,834 | 3/1967 | Buttery | 53/491 X |
| 3,543,997 | 12/1970 | Michetti . | |
| 4,046,313 | 9/1977 | Perry . | |
| 4,084,489 | 4/1978 | Matovich, Jr. | 493/151 X |
| 4,256,526 | 3/1981 | McDaniel | 53/383 X |

OTHER PUBLICATIONS

Marvel Carton—Copyrighted in 1964—disclosed in photographs submitted by applicant.

*Primary Examiner*—Horace M. Culver
*Attorney, Agent, or Firm*—Shlesinger & Myers

[57] ABSTRACT

A carton or package for packaging semi-fluid material which can be hardened by freezing, such as ice cream, sherbet, and the like, is formed from specially constructed integral carton blank and a special process for assembling the same. The carton blank has a front panel, a bottom panel, a rear panel, a cover panel, and a front cover sealing flap articuated one to the other in the order named. With end-forming flaps and glue-flap extensions extending laterally therefrom adapted to be glued together to form inner and outer walls and side-cover flaps. The bottom outer wall-forming flap is glued to the inner wall-forming flaps by glue strips along the side edges of the latter, where they are joined to the front and rear panels, and the side-cover flap has a tuck-in tab adapted to be tucked in under the bottom outer wall-forming flap between the glue strips. The glue-flap extensions are adapted to fold over the side-cover flaps and to be glued thereto by an extension of the glue strip adjacent the front of the carton. In forming the carton or package, one end is closed first by folding in the side flap extensions, folding down the side-cover flap, applying the glue strips with the one adjacent the front of the carton extending up over the folded-down side-cover flap, then folding up the bottom outer wall-forming flap to a position overlying the tuck-in tab and folding in the glue-flap extensions over the glue strip on the side-cover flap and causing adherence between the glue and the folded-in flaps. The tube thus formed is then filled and the other end closed in a like manner.

17 Claims, 10 Drawing Sheets

5
16
17
15
15a
18
14a
14
7f
6f
7
5a
6
7c
6c
7a
6a
7b
1
6b
7c
6c
7f
1a
6f
9
9a
2
8a
8
11e
10e
11d
2a
10d
11f
10f
11
11a
3
10
10a
3a
13e
12d
13a
4
12a
12d
4e
13d
13
4c
4b
4d
12

Fig. 5
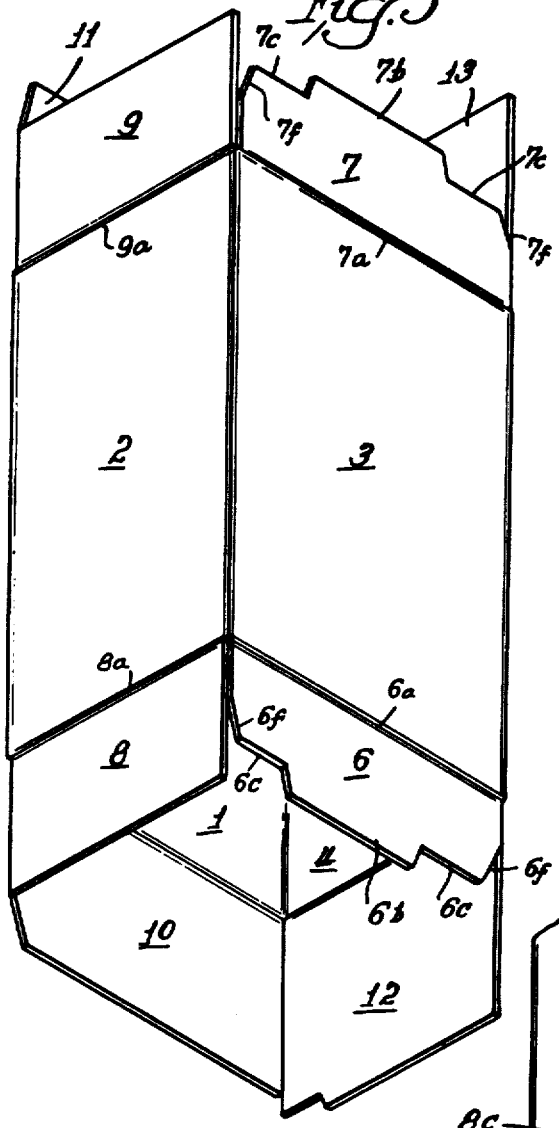
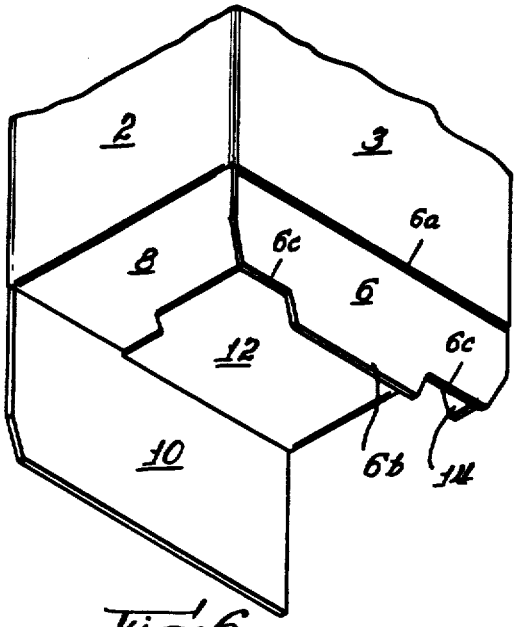
Fig. 6.
Fig. 7.
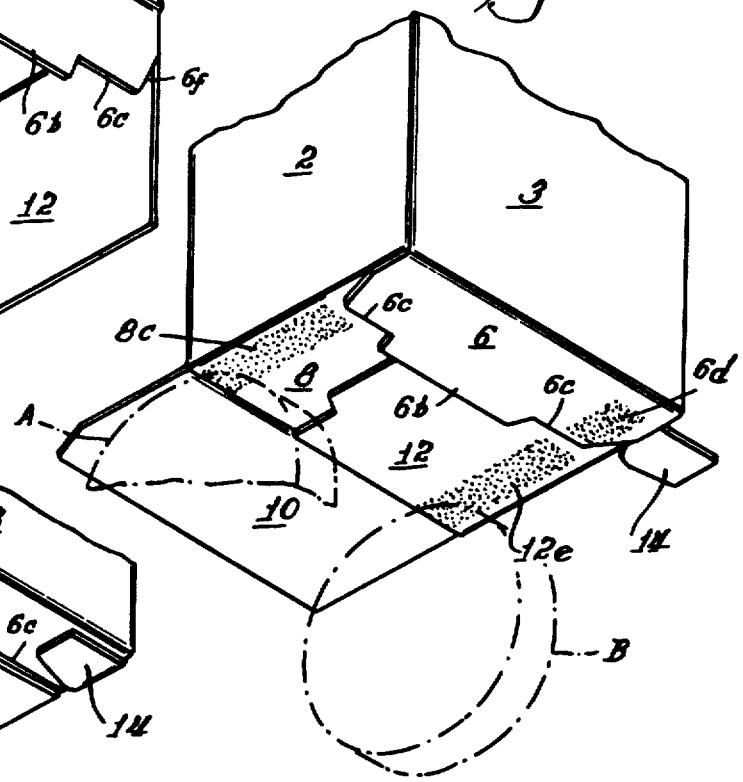
Fig. 8
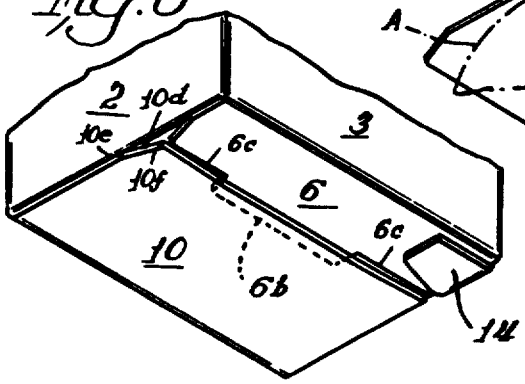

105
114
115
107
101
106
Y
Y
109
102
108
111
103
110
113
x
x
z
z
104
113b
112
112b
104f

FOLDING ICE-CREAM CARTON, CARTON BLANK AND METHOD

Matter enclosed in heavy brackets [ ] appears in the original patent but forms no part of this reissue specification; matter printed in italics indicates the additions made by reissue.

This is a division of application Ser. No. 331,557, filed Dec. 17, 1981, and now U.S. Pat. No. 4,431,129, which is a division of application Ser. No. 158,167, and now U.S. Pat. No. 4,328,656, filed Jun. 10, 1980, which is a division of application Ser. No. 842,747, filed Oct. 17, 1977, now U.S. Pat. No. 4,239,115, issued Dec. 16, 1980.

FIELD OF INVENTION AND PRIOR ART

This invention relates to the art of packaging and is particularly directed to novel carton blank, a novel carton, a novel package and novel methods of preparing the same, which embodies into an ice-cream carton the salient features of earlier U.S. Pat. No. 3,040,957, which embodies all of the salient features of U.S. Pat. No. 1,509,363. In the prior art carton, however, the bottom outer wall forming flap overlaps the entire side cover flap and is glued to the inner wall-forming flaps by horizontal glue strip adjacent the bottom of the side cover flap. Also, the glue flap extensions have glue strips applied to them and the side cover flaps are overlapped and are glued to the glue-flap extensions. The result of these two features is a carton which is not well suited for semi-liquid material such as ice cream and the like, since when it melts it will tend to leak out between the various flaps formed in the end walls of the carton. Moreover, the application of a horizontal glue strip across the inner end wall-forming flaps requires a support for those flaps, such as a mandrel or a filled carton.

OBJECTS OF THE INVENTION

It is an object of the invention to provide improvements in the packaging of semi-solid materials such as ice cream and the like. It is a further object of the invention to provide a carton or package which is simple to manufacture and which is essentially leak-proof. It is a further object of the invention to provide an improved method for making cartons and packages of the class described. It is a further object of the invention to provide novel tube cartons in which the bottom can be formed and sealed without a mandrel. It is still a further object of the invention to provide a package which has improved openability and improved reclosability and which affords improved protection to the contents thereof after opening. It is a further object of the invention to provide novel carton blanks which are adapted for manufacture from paperboard sheet stock in high-speed cutting and scoring machines. It is a further object of the invention to provide such a blank in which there is a minimal of stock wastage in the cutting and scoring operation and economy of raw material usage. Further objects are to avoid disadvantages of the prior art and to obtain such advantages as will appear as the description proceeds.

BRIEF DESCRIPTION OF THE INVENTION

The invention relates to improvements in the packaging of semi-fluid materials such as ice cream and the like and [it] *is* particularly directed to an improved carton or package and improved tube carton and improved carton blank as well as to an improved method of making the same.

In accordance with one aspect of the invention, a carton tube or sleeve is made from an integral carton blank having a front panel, a bottom panel, a rear panel, a cover panel and a front cover sealing flap articulated one to the other in the order named in which the front cover sealing flap is attached to the front panel by a frangible seam and in which the closed end is formed of inner-end wall forming flaps attached to the front and rear panels and by top and bottom outer end wall-forming flaps, the first of which is a side cover flap attached to the end of the cover panel and the second of which is attached to the bottom panel, which carton tube is characterized in that the bottom outer end wall forming flap is glued to the inner end wall forming flaps by glue strips extending along the edges thereof which are attached to and adjacent the front and rear panels and in that the side cover flap has a tuck-in tab adapted to be inserted under the bottom outer end wall forming flap between the glue strips. Advantageously the glue strips extend from the bottom of the inner end wall forming flaps and the bottom of the bottom outer end wall-forming flap up to the top of the latter.

This effectively seals the end walls from the bottom up to the top of the bottom end wall-forming flap, thus precluding leakage between the inner end wall-forming flaps and the bottom outer end wall-forming flap. Advantageously the front cover sealing flap has a lateral glue-flap extension which is adapted to be glued to the side cover flap.

Also advantageously the frangible seam on the front cover sealing flap has a tear strip.

The tube or sleeve carton as formed, with the bottom or one end sealed, is filled with the material to be packaged and the other end, which has the same types of flap extensions, is closed and sealed in a like manner.

The several panels and the front cover sealing flap are separated by horizontal score lines and the flaps and the panels are separated by vertical score lines. It will be understood that the terms vertical and horizontal are used merely for the purposes of orientation and that if the blank is rotated 90 degrees. The vertical score line become horizontal score lines and vice versa. The side flap extensions are separated from the front cover flap also by vertical score lines which are displaced with respect to the other vertical score lines so that the distance between them is greater than the distance between the other vertical score lines by that required for the glue-flap extension to overlap the side cover flap and thus allow the side cover flap to lie flat against the inner end wall formed by the inner end wall-forming flaps. The closer the cover flap lies along the end wall, the less leakage there will be.

In assembling the tube carton from the integral paperboard blank thus described, the front cover sealing flap is glued or otherwise fastened to the front panel, thereby forming a tube which when erected has a rectangular cross section and, when collapsed, is flat. The collapsed tube coming from stock is opened up and the inner end wall-forming flaps are folded in. The side-cover flap is then folded down over the folded-in inner end wall-forming flaps. Glue strips are then applied to the glue strip areas on the outer edges of the inner wall formed by the folding in of the inner wall-forming flaps and the one adjacent the front of the carton tube is extended up over the folded down side-cover flap. The bottom end wall-forming flap is then folded up over the tucked in tab of the side-cover flap and the glue flap extensions are folded in over the glue strip on the side cover flap, and the bottom outer wall-forming flap and the glue-flap [extension] *extensions* are caused to adhere to the glue strips to form a sealed end.

Desirably, when the glue strips are applied, the bottom outer end wall-forming flap and the glue-flap extension are bent out of the way and a hot-melt glue is applied by rollers or guns, or other means, starting either at the top or at the bottom of the application at the front of the carton extending up over the folded-down side-cover flap, and the application at the side that is adjacent to the rear panel either starting or terminating at or adjacent to the bottom of the side-cover flap. The tube carton thus formed is then filled and the other end closed in the same manner. The blanks according to the invention are adapted for making either top-opening or side-opening cartons. In the form shown, the top and bottom panels are wider than the rear and front panels, so that the resulting carton is a top-opening carton. Thus, when the tear strip is torn, the cover, which has a front cover flap which is glued to the side-cover flaps by the glue-flap extensions, can be raised up to expose the contents and the closed again with the tuck-in tabs tucked in to hold the cover securely in place.

In accordance with a preferred form of the invention, the side flaps, including the glue-flap extension, progressively diminish in size from the front panel to the front cover sealing flap so that, when two flat blanks are side by side in reverse position, the inner wall-forming flap attached to the front panel abuts the side-cover flap of the other blank, and so on, so that there is very little scrap lost in the cutting and scoring of the blanks from a continuous sheet of stock. Advantageously, the inner outer corners of the inner wall-forming flaps attached to the front panels are cut away to accommodate the tuck-in tab.

If desired, however, one or the other of the inner wall-forming flaps can be extended to fit snugly into or to cover the end of the carton tube. In the latter case, the outer edge of such a flap desirably is short enough so that it does not overlie the glue strip area, otherwise it must be glued to the underlying flap.

Advantageously, the front panel has a top edge cut down to form corner posts at the sides thereof so that the cover fits firmly and snugly against the carton after it is opened.

In some cases, it is desirable to provide a fold-in flap on the top edge of the front panel adapted to fold in under the cover and thus improve the seal when the cover is closed. When this flap is attached to the cut-down edge and the cover is closed, it will angle up to prevent leakage or seepage of the product between the front panel and the front cover flap.

If desired, the front cover flap can be glued to cut-scored portions of the front panel to hold it flat and firm in the collapsed tube. This has a further advantage that, when the tear strip is removed and the cover flap pulled forward, the pull-outs will be left on the inside of the cover flap and thus form detents when the cover is closed to hold the cover in closed position. The fold-in flap on the front cover is particularly of advantage in this case, because it acts as a ramp for the cut-outs to slide over when the cover is closed and as a spring to pull into contact with the hole from which they were cut out.

The carton blanks of the invention has the advantage that the tube carton and package can be formed therefrom without the use of mandrels and, as compared with methods requiring mandrels, result in substantial savings both in the machinery required for forming, filling, and closing the package and in savings in the floor space required to house the same.

DETAILED DESCRIPTION OF THE DRAWINGS

In the drawings:

FIG. 5 is an isometric view of the opened-up tube of FIG. 3.

FIG. 6 is a partial view of FIG. 8, showing the inner end wall-forming flaps folded in.

FIG. 7 is a partial view showing the cover side flap folded in, remaining flaps folded out, hot-melt glue strips applied, and stylized applicators therefor.

FIG. 8 is a view in which the remaining flaps of FIG. 7 are folded into place to form the closed end of the carton tube.

FIG. 11 is a partial view showing the other inner end wall-forming flap folded in.

DETAILED DESCRIPTION OF THE INVENTION

Figure 1:
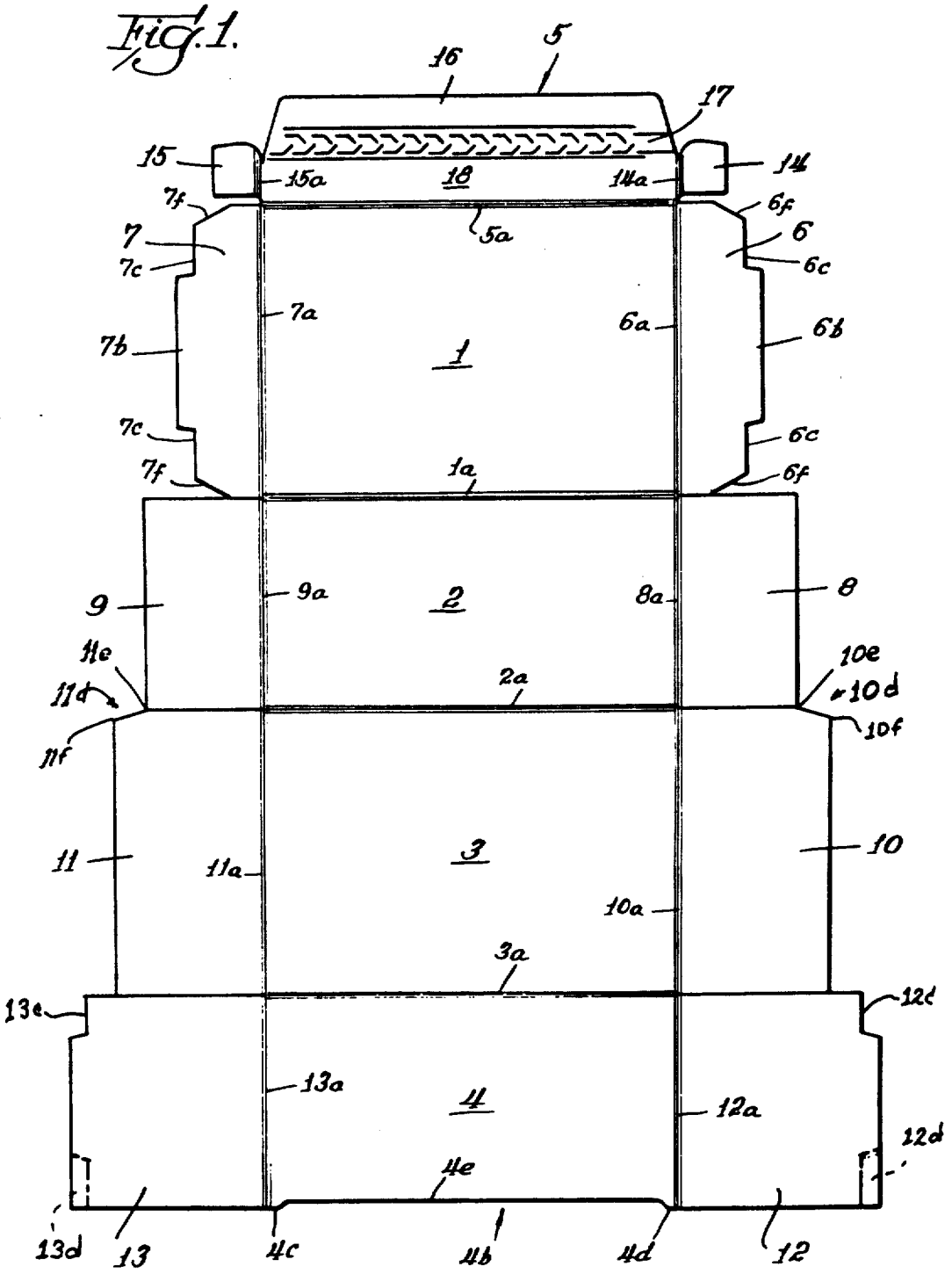
FIG. 1 is a plan view of a carton blank.

Referring now particularly to FIG. 1, there is shown a carton blank having panels 1, 2, 3, and 4, articulated in that order by horizontal score lines 1a, 2a, and 3a. The panel 1, which is the cover-forming panel, has articulated thereto sealing flap 5 by the horizontal score line 5a.

Extending laterally from the panels 1, 2, 3, and 4, are side-forming panels 6 through 13, which are articulated with the panels by means of the vertical score lines 6a through 13a. The flaps 6 and 7 are side-cover flaps. Flaps 8 and 9, which extend laterally from the rear panel 2, are inner end wall-forming flaps. Flaps 10 and 11, which extend laterally from the bottom panel 3, are partial outer end wall-forming flaps. And flaps 12 and 13, which extend laterally from the front panel 4, are inner end wall-forming flaps.

The cover sealing flap 5 has a glue tab 16 connected to the cover flap 18 by tear strip 17. Projecting laterally from the cover flap 18 are glue-tab extensions 14 and 15, which are articulated therewith by vertical score lines 14a and 15a. The vertical score lines 7a, 9a, 11a, and 13a are aligned in an essentially common vertical score line and, similarly, with respect to score lines 6a, 8a, 10a, and 12a. The score lines 14a and 15a, however, are displaced laterally with respect to the other vertical score lines, so that the distance between the score lines 14a and 15a is greater than the distance between the score lines 6a and 7a such that, in the erected carton, the glue-tap extensions 14 and 15 overlie the cover side flaps 6 and 7.

Figure 2:
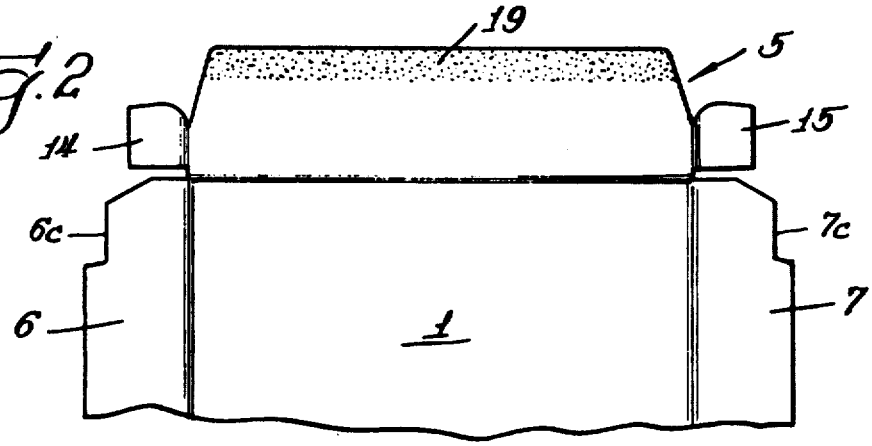
FIG. 2 is a detail view of a modified form of FIG. 1.

In FIG. 2, the tear strip 17 is omitted and a frangible glue 19 is applied so that the cover can be readily broken away from the front panel.

Figure 3:
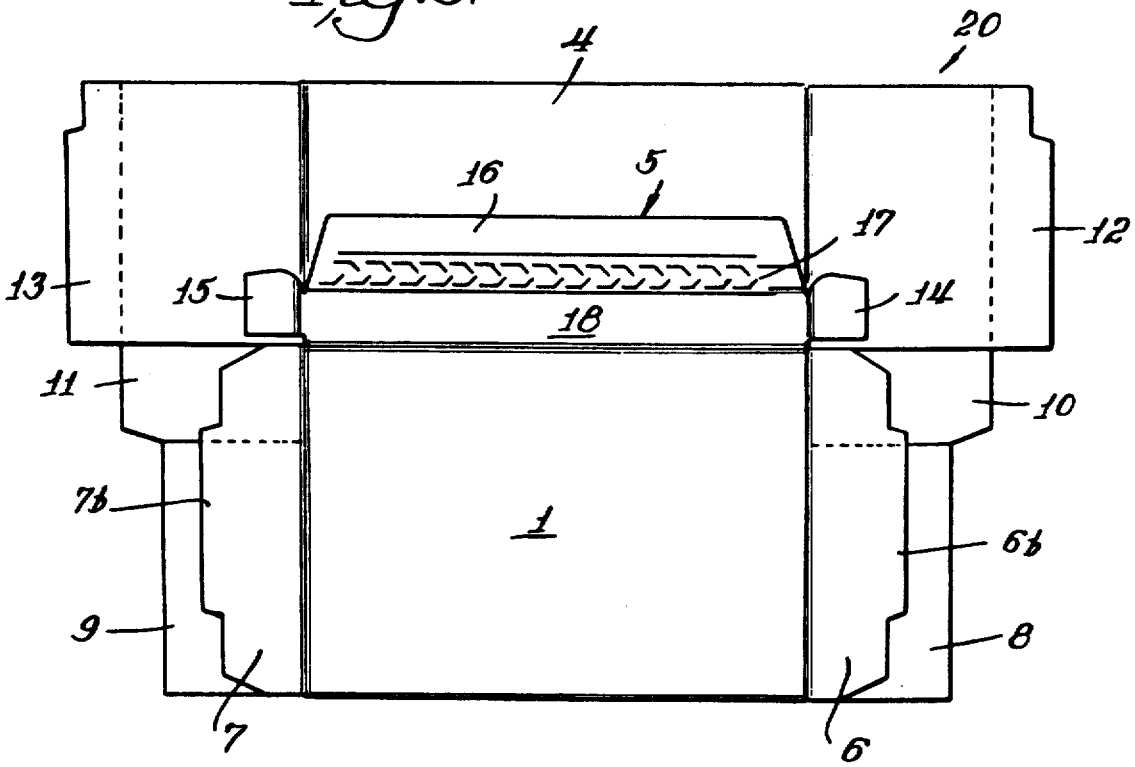
FIG. 3 is a collapsed carton tube formed of FIG. 1.
Figure 4:
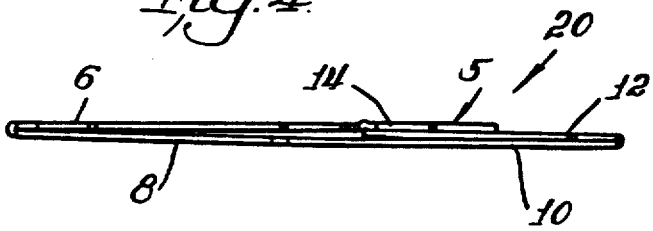
FIG. 4 is an end view of FIG. 3.

In FIGS. 3 and 4, the glue tap 16 is glued to the front panel 4, to form a collapsed tube, which can be opened up into the tube shown in FIG. 5.

The side-cover flaps 6 and 7 are provided with tuck-in tabs 6b and 7b. These tabs extend over the greater portion of the bottom edge of the side-cover flaps 6 and 7, but are inset from the ends thereof as shown at 6c and 7c, for a purpose which will become apparent in the description of the assembly of the carton.

In assembling the carton, the inner end wall-forming flap 8, which is attached to the rear panel 2, is folded in first and then the inner end wall-forming flap 12, which is attached to the front panel 4, is folded in to overlie flap 8, as shown in FIG. 6, or vice versa. Then the side-cover flap 6 is folded down, the outer end wall-forming flap 10 and the glue-tap extensions 14 are folded back out of the way and hot-melt glue applicators A and B apply hot-melt glue strips 6d, 12e and 8c. The hot-melt applicator, B, first contacts the side-cover flap 6 and deposits the glue strip 6d and then continues on to deposit the glued strip 12e. Concurrently, as the glue strip 12e is applied, the glue strip 8c is applied by glue applicator A. The applicators A and B are programmed so that the glue strip 6d is applied first and then the glue strip 8c and 12e applied simultaneously. If desired, the glue strip 6d can be applied independently of the application of the glue strip 12e. Also, if desired, the glue strips can be applied in the reverse order, that is, from the bottom panel upward. Either the glue applicators A and B can be mounted to move over the carton tube of FIG. 7, or the glue applicators A and B can be stationary and the partially-assembled tube of FIG. 7 passed under or over or, in any event, passed into contact with the glue applicators A and B.

Advantageously, the partially assembled tube cartons can be moved along a continuous belt (not shown), with the open end resting on the belt and the end to be sealed, uppermost. In such case, it is desirable that the movement be in the direction of the folded-back flap 10, so that any tendency for the flaps 8 and 12 to be displaced will be corrected by the flap 6, which is folded down over the folded-in flaps 8 and 12.

Since the glue strips are applied adjacent the score lines, the front and rear panels provide support for the flaps so that the sealing of the ends can be effected without a mandrel or before the carton is filled.

The next step is to fold in the outer wall-forming flap 10 and the glue-flap extension 14 into contact with the glue strips, as shown in FIG. 8.

It will be observed that the outer wall-forming flap 10 and the side-cover flap 6 are proportioned so that the flap 10 covers the tuck-in tab 6b and essentially abuts the inset portions 6c, thereby forming the outer wall of the end of the carton.

Figure 13:
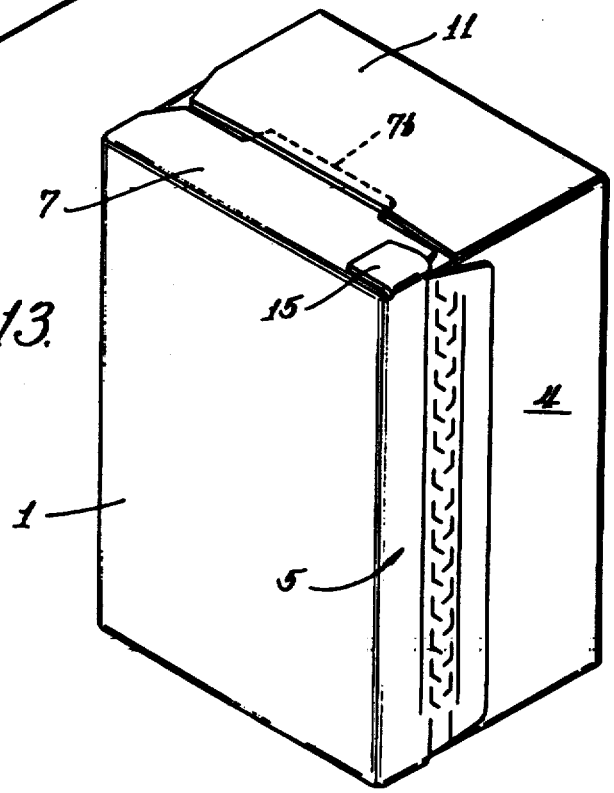
FIG. 13 shows the finished package in which the folded-out flaps of FIG. 12 have been folded over into contact with the glue strips.
Figure 14:
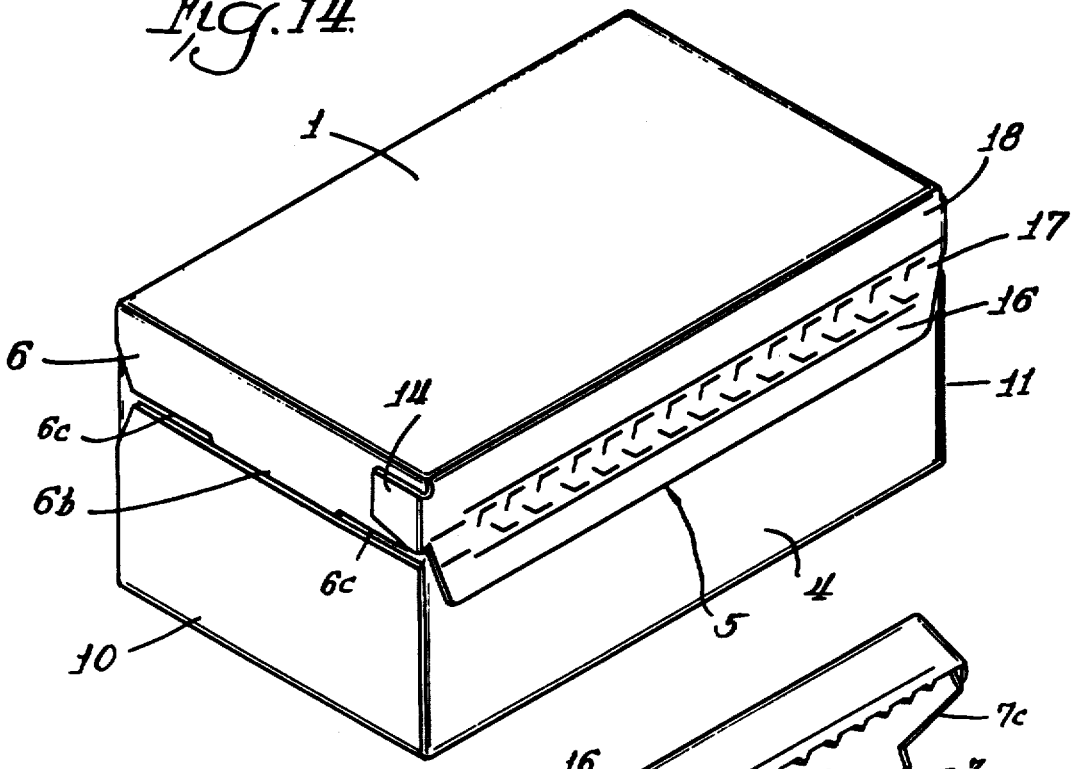
FIG. 14 is an isometric view of the finished package of FIG. 13.
Figure 9:
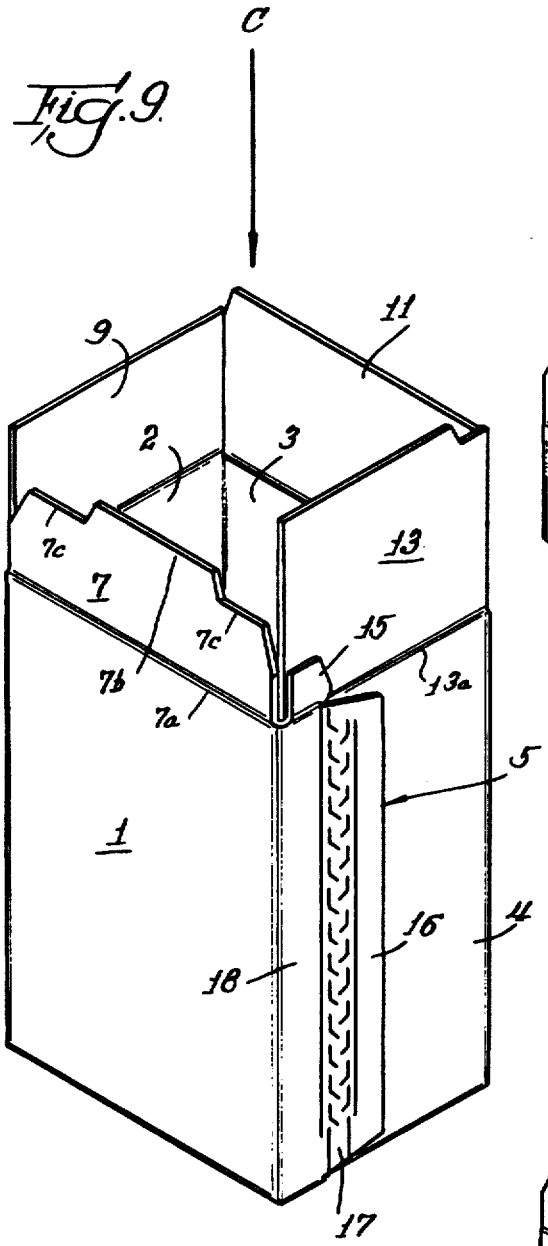
FIG. 9 is an isometric view of the closed end of the carton tube in position to be filled.
Figure 10:
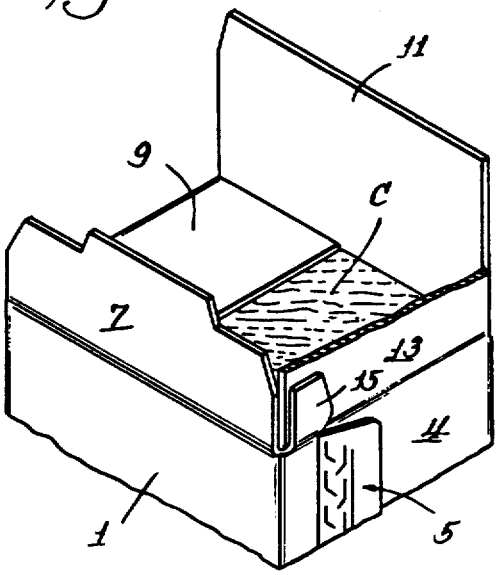
FIG. 10 is a partial view of the filled carton tube with one of the inner end wall-forming flaps folded in over the contents.
Figure 11:
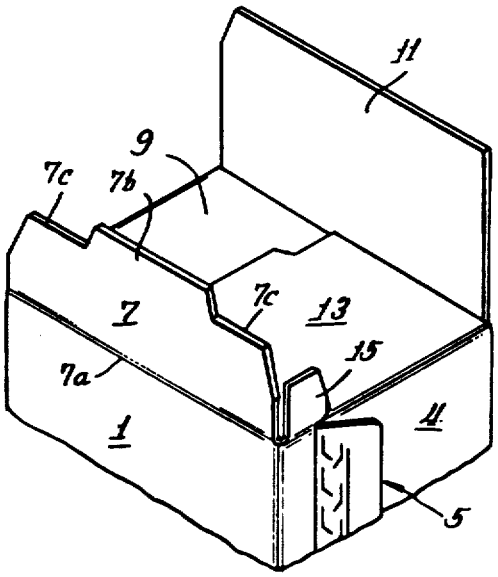

The partially-assembled carton, with one end sealed and the other end open, is passed under a filling station, as shown in FIG. 9, where a semi-solid material at ambient temperature C, which suitably is ice cream, sherbet, or the like, is introduced into the open-ended tube until it is filled to the level of the score lines. The inner end wall-forming flap 9 is then folded in, as shown in FIG. 10, followed by the folding in of the overlapping end wall-forming flap 13, or vice versa, as shown in FIG. 11. The sealing process is then carried out, as shown in FIG. 12, in the same way that the other end was sealed, as shown in FIG. 7, to form a finished package, as shown in FIGS. 13 and 14.

Figure 15:
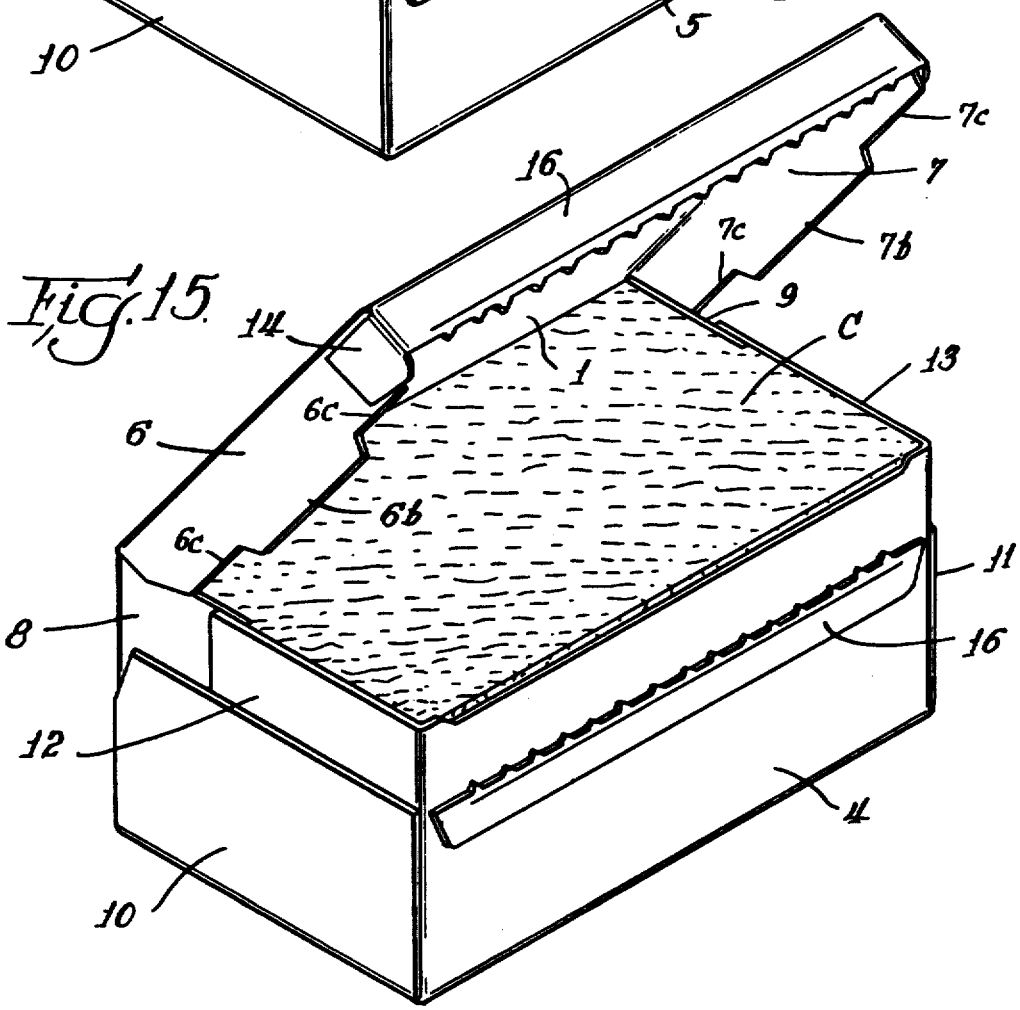
FIG. 15 is an isometric view showing the cover raised.

When the tear strip 17 is removed, the cover can be raised, as shown in FIG. 15, and again closed, with the tuck-in tabs 6b inserted between the outer end-wall flap 10 and the inner end-wall flap 12.

Figure 12:
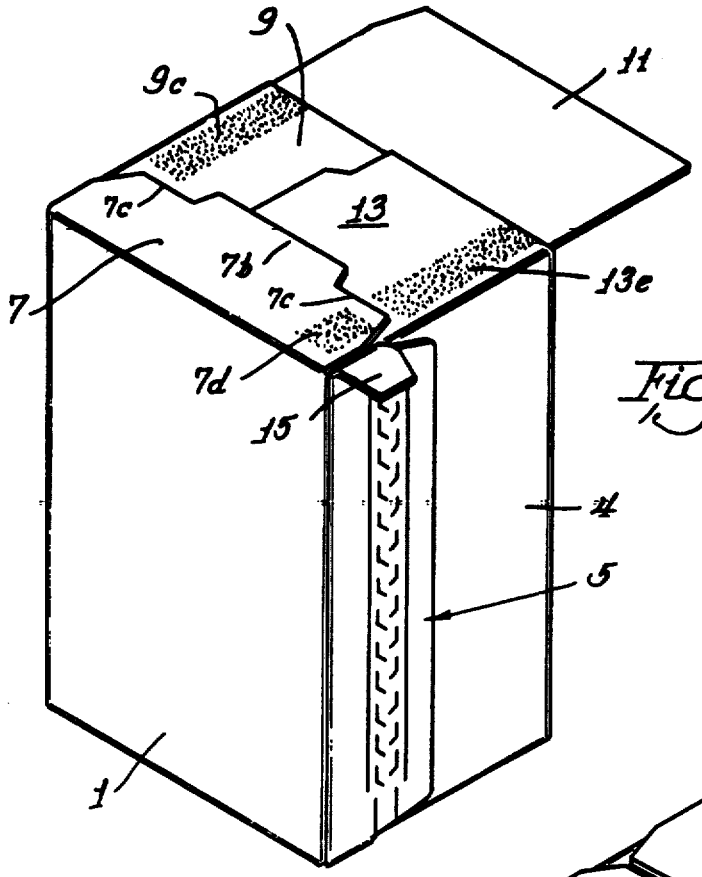
FIG. 12 is an isometric view showing additionally the cover side flap folded in and the other flaps folded out, together with glue strips of hot-melt glue applied as in FIG. 7.

The insets 6c, as best seen in FIGS. 7 and 12, are inset just enough to accommodate the glue strips 8c and 12e. Similarly, the inserts 7c are inset just enough to accommodate the glue strips 9c and 13e.

The glue strips 8c and 12e extend down to the bottom of the inner wall-forming flaps 8 and 12 and, if desired, partly onto the outer end wall-forming flap 10 so that, when the flap 10 is folded up, a leak-proof seal between the flaps 8, 10, and 12 is obtained. Similarly, in connection with FIG. 12, a leak-proof or leak-resistant seal is obtained between the flaps 9, 11, and 13.

By virtue of the fact that the glue-tab extensions 14 and 15 are on the outside of the side-cover flaps 6 and 7, the side-cover flaps 6 and 7 lie flat against the inner end wall and enhance both the strength of the cover and the leak-proof character of the package. In the prior art, the glue-flap extensions are folded under the side-cover flaps and are glued to the underside thereof, thus placing a short layer of paperboard between the side-cover flap and the end wall. This separates the side-cover flap from the end wall and promotes leakage. In the invention, on the other hand, the glue-flap extensions overlap the side-cover flap and are glued to the outside thereof, so that the side-cover flap lies flat against the end wall. This minimizes leakage because the more extensive the flat surface-to-surface contact between the side-cover flaps and the end walls, the less tendency there is for leakage to occur. In FIG. 1, it will be observed that the front panel is cut down at 4b to provide shoulders 4c and 4d adjacent the score lines 12a and 13a. Thus, the top edge 4e of the front panel 4 is slightly below a line extending from the shoulder 4c to the shoulder 4d and parallel thereto. This cooperates with the outside sealing of the glue-tap extensions 14 and 15, further to enhance the leak-proof feature of the container.

This feature can still further be enhanced by attaching to the top lid 4e, a flap as shown at 4f, in FIG. 16, the function and construction of which will be described more particularly in connection with FIG. 16.

Figure 16:
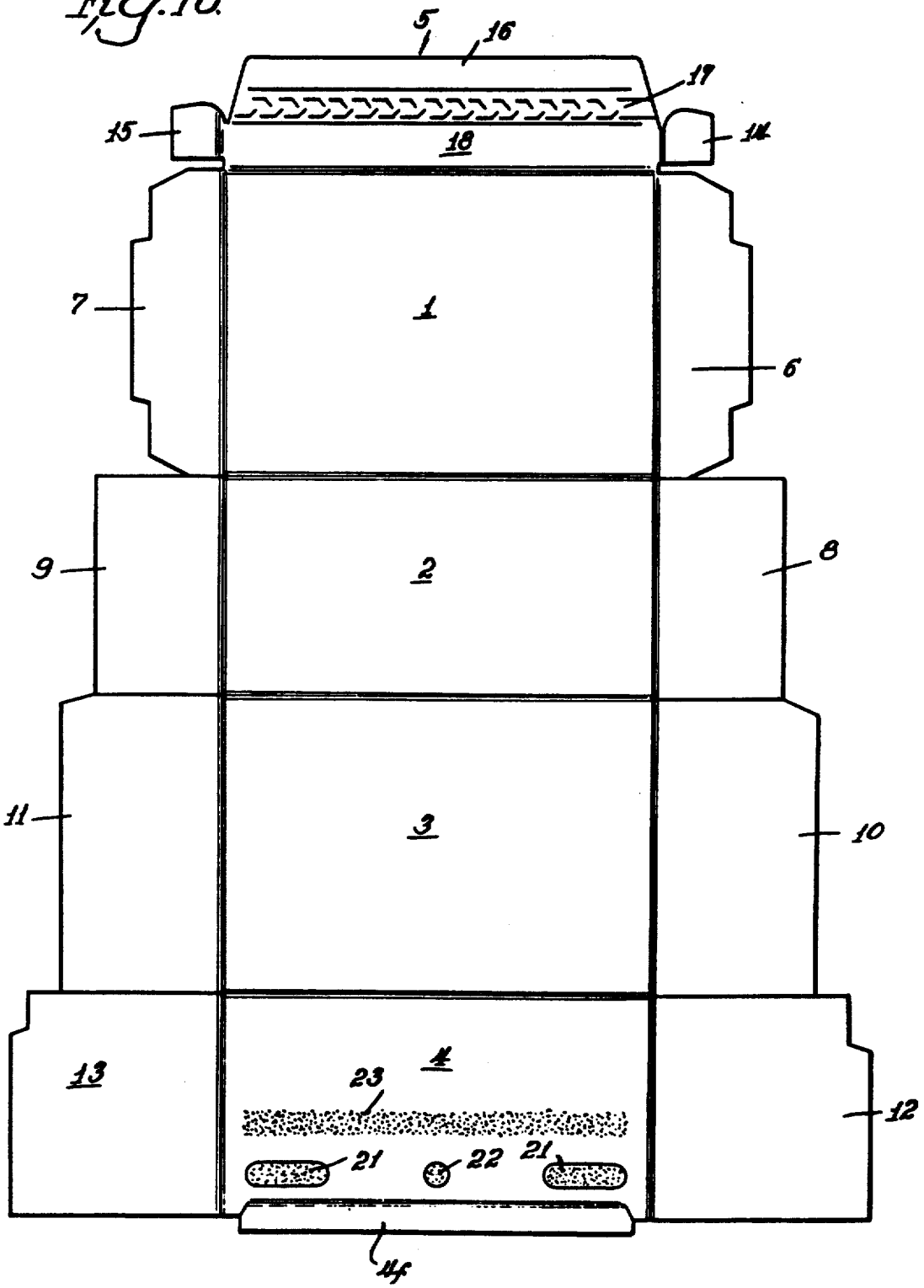
FIG. 16 is a plan view of a modified carton blank.
Figure 21:
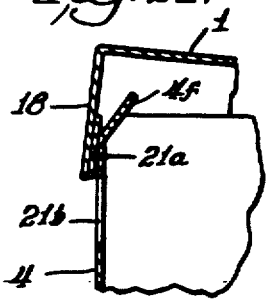
FIG. 21 is a partial section of the modification of FIG. 20 showing the cover detached and partially raised.
Figure 20:
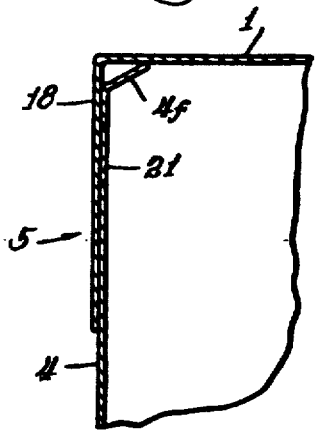
FIG. 20 is a detailed section of a carton assembled from the blank of FIG. 16.

In FIG. 16, there is shown a modification which has the flap 4f and cut-scored pull-outs 21 and 22 located in the portion of the front panel 4 which underlies the front-cover flap 18. Glue is applied to these pull-outs 21 and 22 and to the portion of the panel underlying the glue tab 16 so that, when the front cover-sealing flap 5 is sealed to the front panel, the whole sealing flap will be held in flat contact with the front panel 4, from the collapsed position shown in FIG. 3, through all the subsequent operations. Then when the tear strip 17 is removed and the cover raised, the pull-outs 21 and 22 will adhere to the cover and not seriously interfere with the opening of the cover. Furthermore, when the cover is closed, the pulled-out portions will engage the holes from which they were pulled out and act as detents to hold the cover closed. This can more readily be seen from FIG. 21, where the pulled-out portion 21 is attached to the front-cover flap 18, in position to enter the hole 21b. Also, it will be observed in FIGS. 20 and 21, when the flap 4 is bent in under the cover 1, it will angle up so that its lip engages the inner surface of the cover panel 1, as shown in FIG. 20. When the cover is raised as shown in FIG. 21, the tab 4f tends to spring up so that when the cover is again closed and the pull-out 21a seated in the hole 21b, a tight and intimate seal is effected.

If desired, the pull-outs 21 and 22, or the equivalent thereof, can be in the flap 4f, or 104f. Alternatively, the tab 4f, or 104f, can be spot-glued to the cover panel.

Even when the pull-outs 21 and 22 are not employed, the flap 4f will have a similar effect due to the friction between the side and front cover flaps of the cover panel 1, with the carton sides. The flap 4f also makes it possible to effectively eliminate the pull-outs 21 and 22 entirely. The flap 4f has its edge in contact with the inner surface of the cover panel, as shown in FIG. 20, and thus, effectively prevents leakage in a filled carton, even if the top portion of the front panel is separated from the front cover panel. The flap 4f thus eliminates the need for a double glue line.

Figure 17:
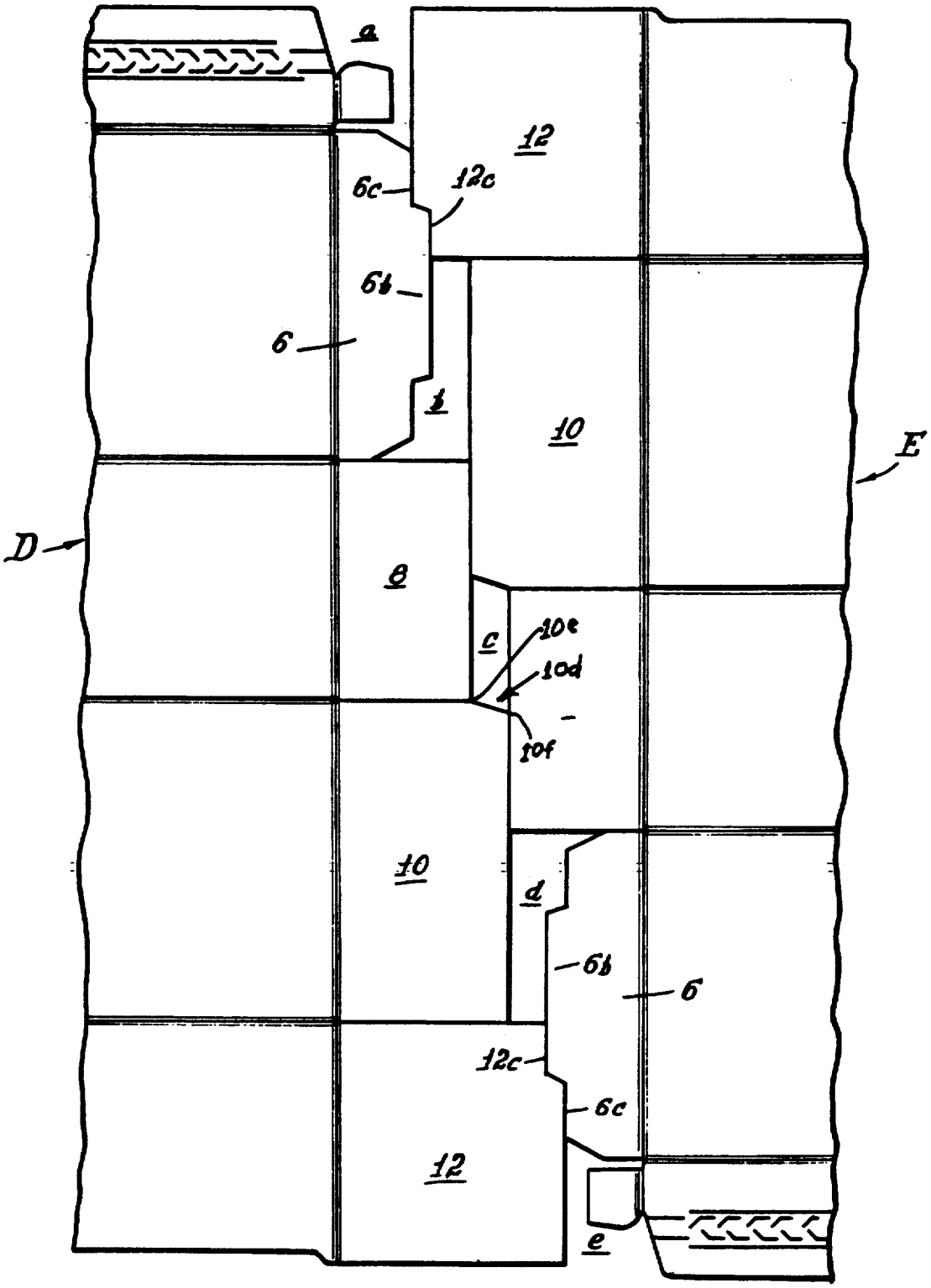
FIG. 17 is a plan view illustrating how the carton blanks of FIG. 1 are cut and scored from stock sheet material.

FIG. 17 illustrates how the carton blanks of the invention are particularly adapted to high-speed production from continuous sheet or roll stock and high-speed cutting and scoring machines. It will be observed that the laterally-extending flaps are progressively wider, so that when the blank E is placed in juxtaposition to blank D in reverse order, the wider flaps of blank D are opposite the narrower flaps of blank E, nd so on. Thus, the inner end wall-forming flap 12 abuts the side-cover flap 6 and has a cut-out portion 13c which abuts tuck-in tab 6b. The outer wall-forming flap 10 abuts the inner wall-forming flap 8; the inner wall-forming flap 8 abuts the outer wall-forming flap 10; the side-cover flap 6 abuts the inner end wall-forming flap 12, which also has a cut-out portion 12c which abuts and is complementary with the tuck-in tab 6b; just as the cut-out portion 12c of the other blank is complementary with the tuck-in tab 6b. It will thus be observed that, essentially, the only scrap material is that shown by the portions a, b, c, d, and e. The result is a carton blank of the smallest area of any glue-sleeve ice-cream carton known in the art.

It will be observed more clearly in FIGS. 1 and 17, that the outer end-forming flaps 10 and 11 have their outer inner corners, i.e., the corners which are adjacent the rear panel, flaps 8 and 9, cut off, as shown at 10d and 11d. The purpose of this is best seen in FIG. 8, where the bottom corner 10e is firmly affixed to the glue strip 8c and the upper corner 10f, if not firmly attached to the glue strip 8c, is still inset from the panel 2, so that it is not an easily engaged corner which could be pulled up during the making or handling of the finished package or carton.

Figure 18:
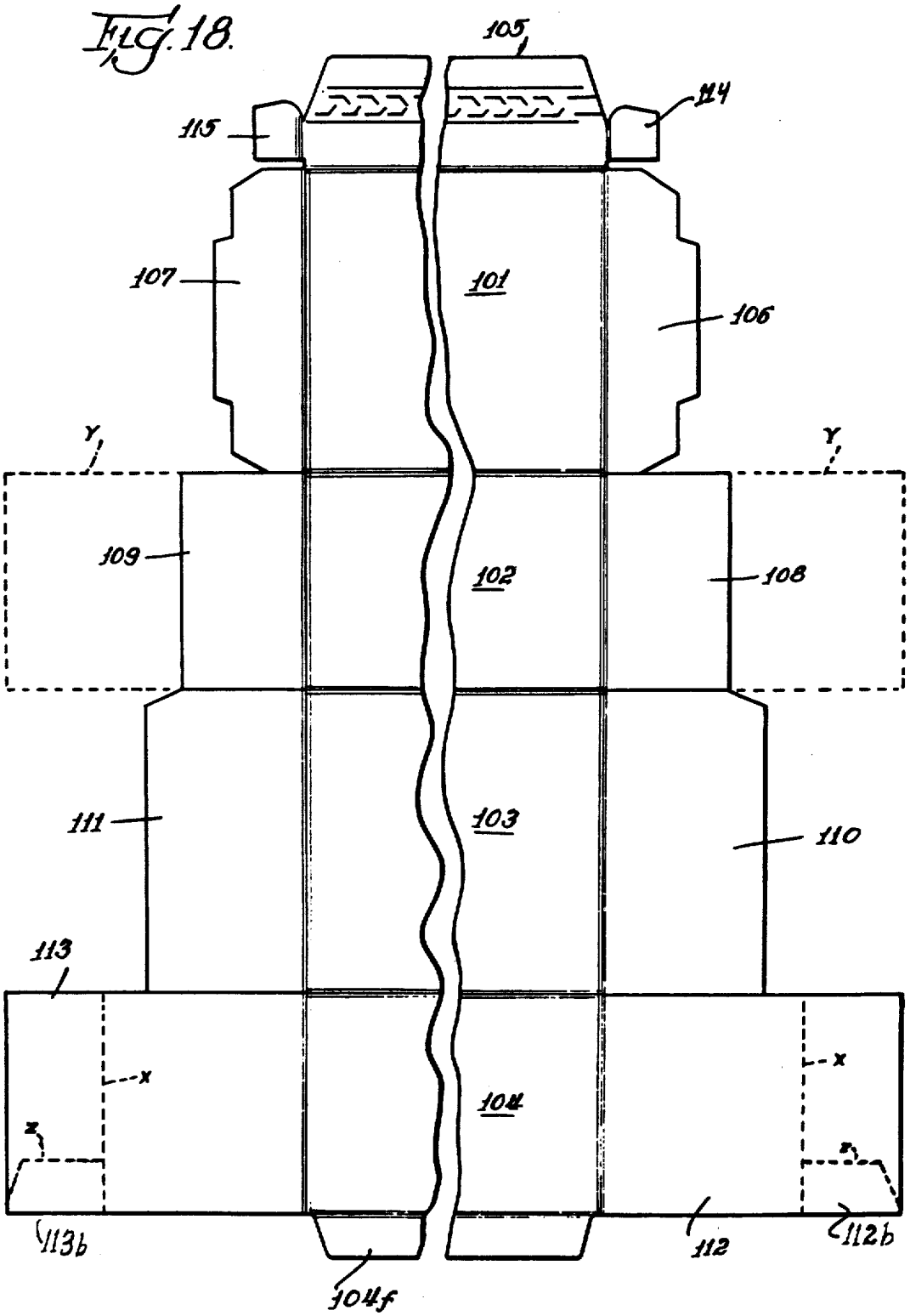
FIG. 18 is a plan view of a modified carton blank.

In FIG. 18, there is shown a modification in which one or the other or both of the inner end wall-forming flaps is extended beyond the dotted line x or, to the dotted lines y, so that it occupies the full end of the carton tube, and thus overlies completely the contents of the tube. It is of advantage, however, that only one of these flaps be so extended, since if the overlying flap does not terminate short of the glue area, it will have to be joined (glued) thereto by a separate glue line applied along the edge of the underlying flap adjacent to the panel to which it is attached. Otherwise, the outer end wall-forming flap 110 would be glued to the free end of the overlapping inner end wall-forming flap, so that the effective seal would not be obtained without the extra glue line.

The inner end wall-forming flaps 112 and 113 can be cut on the dotted lines Z-Y to provide the flap extensions 112b and 113b. When the flaps 112 and 113 so cut away overlie flaps 108 and 109, the extensions 112b and 113b will extend under the cover flaps 106 and 107 to the rear panel. This, coupled with the glue-flap extensions 114 and 115 overlying the side-cover flaps 106 and 107, make for continuous flat contact between the side-cover flaps 106 and 107 and the end wall formed by the folded-in end wall-forming flaps. If desired, the extensions 112b and 113b can be glued to the underlying flaps. The stock for the extensions 112b and 113b can be obtained largely from the waste area "a" of FIG. 17.

Figure 19:
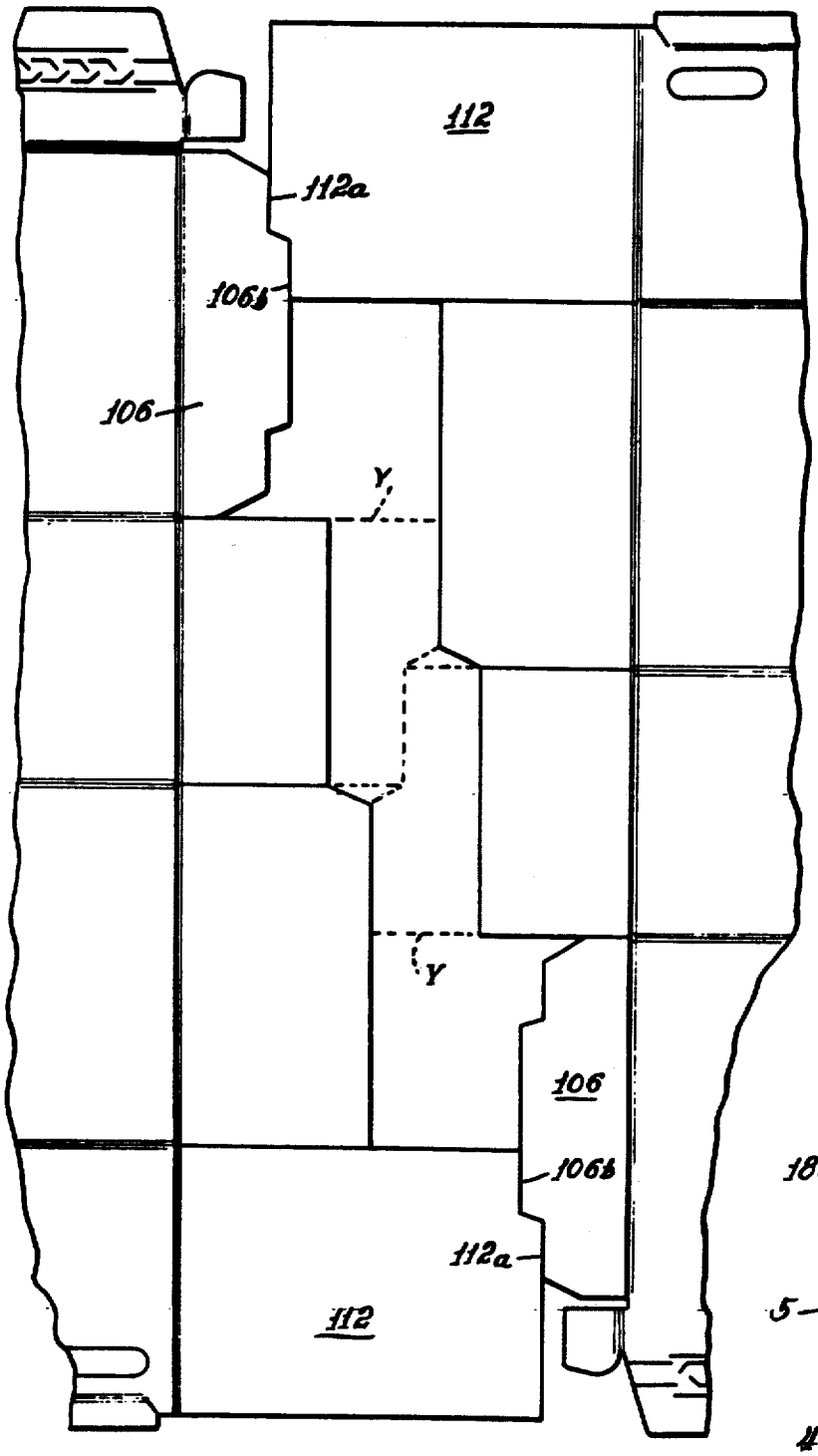
FIG. 19 is a plan view of another modified carton blank showing how this blank is cut and scored from stock sheet material.

In this figure and in FIG. 19, the parts corresponding to the parts of FIG. 1 bear the same reference numerals, plus 100.

In FIG. 19, there is illustrated a modification of FIG. 18, in which the extended underlying inner end wall-forming flaps 112 have cut-outs 112a which are complementary with the tuck-in tabs 106b, so that this modification, too, can be easily formed in a continuous manner with high-speed cutting and scoring machines without too much loss of stock.

The side-cover flaps 6 and 7 have their corners cut off at 6f and 7f to avoid sharp corners which otherwise would tend to curl up.

As shown in FIG. 1, the outer inner corners of flaps 12 and 13 are cut out, as shown at 12c. This has the advantage that the overlap of flaps 12 and 13 with flaps 8 and 9 at the bottom of the carton is minimal. This results in a more leak-proof carton. The same advantage can be obtained at the top by cutting out the outer outer corners of the flaps 12 and 13, as shown in dotted lines, at 12d and 13d. When this is done, the flaps 12 and 13 have a minimal overlap with flaps 8 and 9 at both the top and the bottom and the result is that there is less likelihood of the contents seeping out of the package.

It is to be understood that the invention is not to be limited to the exact details of operation or structure shown and described, as obvious modifications and equivalents will be apparent to one skilled in the art.

I claim:

1. A method for closing an end of a carton tube formed of front, rear, cover, and bottom panels fastened together into a tube by means of a front cover flap fastened to the front panel, having respectively connected to said panels and said front cover flap, by fold lines, front and rear panel inner end wall-forming flaps, one of which is adapted to overlie the other when they are folded in; a side cover flap having a tuck-in tab projecting from the mid-portion thereof, which side cover flap is adapted, when it is folded in, to overlie the overlying inner end wall-forming flap; a bottom panel flap adapted, when folded in, to overlie the tuck-in tab of the side cover flap; and, a glue-flap extension of the front cover flap adapted, when folded in, to overlie the fold-in side cover flap, which method comprises folding in one of the inner end wall-forming flaps, folding in the other inner end wall-forming flap so that it overlies the one already folded in, folding in the side cover flap thereover, applying strips of glue along and adjacent the fold lines between the folded-in inner end wall-forming flaps and the panels to which they are connected, the glue strip adjacent the rear panel [being terminated short of the folded-down side cover flap and] being disposed between the tuck-in tab and the rear panel, and the other glue strip extending up over the folded-down side cover flap between the tuck-in tab and the front panel, and then folding the outer end wall-forming flap and the glue-flap extension into contact with said glue strips and causing them to adhere thereto [without a mandrel].

2. The method according to claim 1, in which said glue is hot-melt glue and in which the two strips are simultaneously applied by hot-melt glue applicators.

3. The method according to claim 2, in which, before the hot-melt glue is applied, the outer end wall-forming flap and the glue-flap extension are bent back out of the way and the hot-melt glue is applied to said end wall from the bottom panel upward, [the application of the glue strip adjacent the rear panel being terminated below the side cover flap and] the application of the glue strip adjacent the front panel being continued up over the side cover flap.

4. The method according to claim 2, in which, before the hot-melt glue is applied, the outer end wall-forming flap and the glue-flap extension are bent back out of the way and the hot-melt glue is applied to said end wall from the cover panel downward for the strip adjacent the front panel [and from the bottom edge of the side cover flap for the strip adjacent the rear panel].

5. A method for erecting a closed-end carton tube from an open carton tube having a front panel, a bottom panel, a rear panel, a cover panel, and a front cover sealing flap; said panels being articulated to one another in the order named, and said front cover sealing flap being articulated to said cover panel, and said front cover sealing flap overlying said front panel being sealed thereto to form said panels into a tube having a rectangular transverse cross section; said front and rear panels having laterally-projecting, inner end wall-forming flaps articulated thereto by parallel score lines; said bottom panels having laterally-projecting, outer end wall-forming flaps articulated to be bent up to a position overlying said inner end wall-forming flaps; said cover panel having laterally-extending side cover flaps articulated to the side edges thereof by parallel score lines adapted to overlie the end walls when the carton is erected; and the front cover flap having extensions articulated to the side edges thereof by parallel score lines, which extensions are adapted to be adhered to said side cover flaps to form, with said cover panel, a cover hinged to said rear panel and adapted to overlie the side and front panels of the assembled carton; in which erected tube one end of the tube is closed by the cover side flap overlying folded-in inner end wall-forming flaps, by the outer end wall-forming flap being adhered to the inner end wall-forming flaps by vertical adhesive strips adjacent the score lines which do not extend above the top edge of the outer end wall-forming flap, and in which the folded-down side cover flap has a short adhesive strip which lies under the extension and adheres the extension to the outside of the cover flap, said short adhesive strip being an extension of the vertical adhesive strip adjacent the front panel, which comprises the steps of folding in the front and rear inner end wall-forming flaps at one end, folding down a side cover flap thereover, applying strips of adhesive along the sides of the folded-in inner end wall-forming flaps adjacent to the panels from which they project, the adhesive [strips] *strip* adjacent the [rear] *front* panel [being terminated short of the folded-down side cover flap, and the other adhesive strip] extending up over the folded-down side cover flap adjacent the front panel, and then folding the outer end wall-forming flap and the extension into contact with said adhesive strips and causing them to adhere thereto.

6. The method according to claim 5, in which said adhesive is a hot-melt adhesive and in which the two strips are simultaneously applied.

7. The method according to claim 5, in which, before the hot-melt adhesive is applied, the outer end wall-forming flap and the extension are bent back out of the way and the hot-melt adhesive is applied to said end wall from the bottom panel upward, [the application of the adhesive strips adjacent the rear panel being terminated below the side cover flap and] the application of the adhesive strip adjacent the front panel being continued up over the side cover flap.

8. The method according to claim 5, in which, before the hot-melt adhesive is applied, the outer end wall-forming flap and the extension are bent back out of the way and the hot-melt adhesive is applied to said end wall from the cover panel downward for the strip adjacent the front panel [and from the bottom edge of the side cover flap for the strip adjacent the rear panel].

9. The method according to claim 5, in which the cover side flap has a tuck-in tab at its bottom edge which is inset from the ends of the said side cover flap from which it extends, and wherein the outer end wall-forming flap is folded over said tuck-in tab to secure the folded-down side cover flap between the inner and outer end walls at the closed-end of said carton tube.

10. A method of making a carton tube from an integral carton blank having a front panel, a bottom panel, a rear panel, a cover panel, and a front cover sealing flap articulated one to another in the order named, and having a rectangular transverse cross-section in which the cover sealing flap is attached to the front panel and in which [the] *a* closed end comprises inner end wall-forming flaps attached to said front and rear panels and top and bottom outer end wall-forming flaps; the top of which is a side cover flap attached to the cover panel and the bottom of which is attached to the bottom panel, characterized in that the bottom outer end wall-forming flap is adhered to said inner end wall-forming flaps by adhesive strips extending along the edges thereof adjacent said front and rear panels, and in which the side-cover flap has a tuck-in tab adapted to be inserted under said bottom outer end wall-forming flap between the adhesive strips, which comprises the steps of adhering the front cover sealing flap to the front panel, folding in said inner side wall-forming flaps, applying said adhesive strips along the edges thereof for a distance approximately equivalent to the length of said bottom outer end wall-forming flaps, folding down said side-cover flap, and folding up said bottom outer end wall-forming flap to a position overlying said tuck-in tab and causing it to adhere to said adhesive strips.

11. The method according to claim 6, in which the tube, with one of the front and rear panel inner end wall-forming flaps folded in over the other, with the side cover flap folded down in surface to surface contact with the outermost of the front and rear inner end-wall forming flaps, and with the outer end wall-forming flap and the extension folded out of the way, is moved relative to hot-melt adhesive applicators, one of which is adjacent the front panel and the other of which is adjacent the rear panel, and in a direction such that the relative movement of the applicators is parallel to the fold lines between the inner end wall-forming flaps and the panel to which they are attached.

12. The method of claim 11, in which the direction of movement is such that the applicators approach the tube from the cover panel side, in which the applicator adjacent the front panel contacts first and side cover panel and applies a strip of hot-melt adhesive thereto, but the other applicator does not, in which both applicators contact the inner end wall immediately below the side cover flap and apply a strip of hot-melt adhesive.

13. The method of claim 12, in which the hot-melt is rolled on by roll-on applicators.

14. The method according to claim 2, in which the tube, with the front panel inner end-wall forming flap folded in over the rear panel inner end-wall forming flap, with the side cover flap folded down in surface to surface contact with the front inner end-wall forming flap, and with the outer end wall-forming flap and the glue-flap extension folded out of the way, is moved relative to the hot-melt glue applicators, one of which is adjacent the front panel and the other of which is adjacent the rear panel, and in a direction such that the relative movement of the applicators is parallel to the fold lines between the inner end wall-forming flaps and the panel to which they are attached.

15. The method of claim 14, in which the direction of movement is such that the applicators approach the tube from the cover panel side, in which the applicator adjacent the front panel contacts first the side cover panel and applies a strip of not-melt glue thereto, but the other applicator does not, in which both applicators contact the inner end wall immediately below the side cover flap and apply a strip of hot-melt glue thereto, at least down to the fold line between the bottom panel and the outer end wall-forming flap, and in which the outer end wall-forming flap and the glue-flap extension are folded into sealing contact with the hot-melt, the application of the hot-melt in this way, along and adjacent the edges of the front and rear panels, making it possible to effect end closure without the use of a mandrel.

16. The method of claim 15, in which the hot-melt is rolled on by roll-on applicators.

*17. The method according to claim 1, in which the glue strip adjacent the rear panel is terminated short of the edge of the rear inset portion of the folded-down side cover flap.*

* * * * *